US012711349B2

(12) United States Patent
Whiteman

(10) Patent No.: US 12,711,349 B2
(45) Date of Patent: Aug. 18, 2026

(54) COMPRESSION AND DECOMPRESSION OF WEIGHT VALUES

(71) Applicant: Arm Limited, Cambridge (GB)

(72) Inventor: Derek David Whiteman, Lund (SE)

(73) Assignee: Arm Limited, Cambridge (GB)

( * ) Notice: Subject to any disclaimer, the term of this patent is extended or adjusted under 35 U.S.C. 154(b) by 884 days.

(21) Appl. No.: 16/830,027

(22) Filed: Mar. 25, 2020

(65) Prior Publication Data

US 2021/0303975 A1 Sep. 30, 2021

(51) Int. Cl.
*G06N 3/02* (2006.01)

(52) U.S. Cl.
CPC .................................... *G06N 3/02* (2013.01)

(58) Field of Classification Search
CPC ........................................................ G06N 3/02
See application file for complete search history.

(56) References Cited

U.S. PATENT DOCUMENTS

2020/0143249 A1* 5/2020 Georgiadis ........... G06N 3/0464
2020/0394514 A1* 12/2020 Cho ..................... G06K 9/6256
2021/0266565 A1* 8/2021 Zhou ........................ G06N 5/04

FOREIGN PATENT DOCUMENTS

CN 108734285 A 11/2018
CN 109416758 A 3/2019
CN 109661780 A 4/2019
WO WO-2019086104 A1 * 5/2019 ............... G06N 3/09
WO WO-2020190772 A1 * 9/2020
WO WO-2020260953 A1 * 12/2020 ........... G06N 3/0454

OTHER PUBLICATIONS

Han, et al., arXiv: 1510.00149v5 [cs.CV] Feb. 15, 2016 (Year: 2016).*

Yang, et al.; "Designing Energy Efficient Convolutional Neural Networks using Energy-Aware Pruning", Apr. 18, 2017, ArXiv: 1611.05128v2 (Year: 2017).*

Chinese Office Action dated May 12, 2025 for Chinese Patent Application No. 202110308740.1.

* cited by examiner

*Primary Examiner* — Viker A Lamardo
*Assistant Examiner* — Sally T. Ley
(74) *Attorney, Agent, or Firm* — EIP US LLP

(57) ABSTRACT

A method of compressing a set of weight values is provided in which an uncompressed set of weight values is obtained, which uncompressed set of weight values includes a plurality of weight values associated with a neural network. A frequently occurring value is identified among the plurality of weight values within the set of weight values and each occurrence of the frequently occurring weight value is replaced within the set of weight values with an index value. The frequently occurring weight value and the index value are associated with the set of weight values. The index value is selected to be less storage intensive than the frequently occurring weight value that it replaces.

13 Claims, 8 Drawing Sheets

| Index | Weight (all bits) |
|---|---|
| 00000000 | 01100011 |
| 00000001 | 01111011 |
| 00000010 | 01000110 |
| ... | ... |
| 00011110 | 01100110 |
| 00011111 | 01111111 |

Fig. 5a

| Sequence of values | Allocation within modified weight set |
|---|---|
| 0 | Index value |
| 1 | Index value |
| 2 | Index value |
| 3 | Index value |
| 4 | Index value |
| ... | ... |
| 30 | Index value |
| 31 | Index value |
| 32 | Weight [0] + 32 |
| 33 | Weight [1] + 32 |
| 34 | Weight [2] + 32 |
| 35 | Weight [3] + 32 |
| 36 | Weight [4] + 32 |
| ... | ... |

Fig. 5b

| Index value | Weight (all bits) |
|---|---|
| 000000000 | 001100011 |
| 100000001 | 101111011 |
| 000000001 | 011000110 |
| ... | ... |
| 00001111 | 101100110 |
| 10010000 | 011101111 |

Fig. 8a

| Sequence of values | Allocation within modified weight set |
|---|---|
| ... | ... |
| -19 | weight [-3] -16 |
| -18 | weight [-2] -16 |
| -17 | weight [-1] -16 |
| -16 | Index value |
| -15 | Index value |
| -14 | Index value |
| ... | ... |
| -3 | Index value |
| -2 | Index value |
| -1 | Index value |
| 0 | Index value |
| 1 | Index value |
| 2 | Index value |
| 3 | Index value |
| ... | ... |
| 13 | Index value |
| 14 | Index value |
| 15 | Index value |
| 16 | weight [0] +16 |
| 17 | weight [1] +16 |
| 18 | weight [2] +16 |
| ... | ... |

Fig. 8b

COMPRESSION AND DECOMPRESSION OF WEIGHT VALUES

BACKGROUND OF THE INVENTION

Field of the Invention

The present invention relates to compression and decompression of weight values.

Description of the Related Technology

Neural network models are known and utilize a pre-trained set of weight values and a sequence of operations using those weight values. For example, within a neural network, a node in a hidden layer may receive inputs from several nodes in a layer above it or an input layer. Each of these inputs has an associated weight value. In one example, the node may multiply inputs from each of the input nodes by the associated weight value and add the resulting products together. Based on the resulting product, the node provides an output value that is determined by an activation function.

When hardware, such as a processor, performs calculations associated with a neural network, each weight value must be loaded from storage and used in a calculation. In some neural networks, such as recurrent neural networks, a weight value may need to be loaded several times. This process consumes both memory and internal bandwidth of the hardware.

SUMMARY

According to a first aspect there is provided a method, performed by a computing device, of compressing a set of weight values in a neural network, the method comprising: obtaining an uncompressed set of numerical weight values, the uncompressed set of weight values including a plurality of weight values associated with a neural network; identifying a frequently occurring positive weight value within the set of weight values; replacing each occurrence of the frequently occurring weight value within the set of weight values with an index value, wherein the index value is a code selected to have shorter bit length than the frequently occurring weight value that it replaces; increasing each positive weight value within the set of weight values that has not been replaced by the index value to accommodate the index value; associating the frequently occurring weight value and the index value with the set of weight values to generate an updated set of weight values; and storing a compressed set of weight values generated based on the updated set of weight values in a computer-readable storage medium.

According to a second aspect there is provided a method, performed by a weight decoder of a neural processing unit, of decompressing a compressed set of numerical weight values that includes a plurality of weight values associated with a neural network, the method comprising: obtaining a compressed set of weight values; identifying one or more index values and respective corresponding frequently occurring weight values associated with the compressed set of weight values; identifying a numerical value of a weight value in the compressed set of weight values and determining whether the numerical value of the weight value has a value that is less than or equal to the number of index values associated with the set of weight values; and for each weight value: if the weight value has a value that is less than or equal to the number of index values associated with the set of weight values, identifying the weight value as an index value and replacing the weight value with a weight value corresponding to the index value, if the weight value has a value that is greater than the number of index values associated with the set of weight values, subtracting a value equal to the number of index values associated with the set of weight values from the weight value.

According to a third aspect there is provided a weight decoder of a neural processing unit, adapted to decompress a compressed set of numerical weight values, which compressed set of weight values includes a plurality of weight values associated with a neural network, the processing element adapted to: obtain a compressed set of weight values; identify one or more index values and respective corresponding frequently occurring weight values associated with the compressed set of weight values; identify a numerical value of a weight value in the compressed set of weight values and determine whether the numerical value of the weight value has a value that is less than or equal to the number of index values associated with the set of weight values; and for each weight value: if the weight value has a value that is less than or equal to the number of index values associated with the set of weight values, identify the weight value as an index value and replace the weight value with a weight value corresponding to the index value, if the weight value has a value that is greater than the number of index values associated with the set of weight values, subtract a value equal to the number of index values associated with the set of weight values from the weight value.

BRIEF DESCRIPTION OF THE DRAWINGS

The present technique will be described further, by way of example only, with reference to the embodiments as illustrated in the accompanying drawings, in which:

FIG. 5*a* is a table showing index values and associated weight values

FIG. 5*b* is a table showing the index values and associated weight values shown in FIG. 5*a* after adjustment to accommodate the index values in the sequence of weight values;

FIG. 8*a* is a table showing index values and associated weights according to a second embodiment;

FIG. 8*b* is a table showing the index values and associated weight values shown in FIG. 8*a* after adjustment to accommodate the index values in the sequence of weight values.

DETAILED DESCRIPTION OF CERTAIN INVENTIVE EMBODIMENTS

Figure 1A:
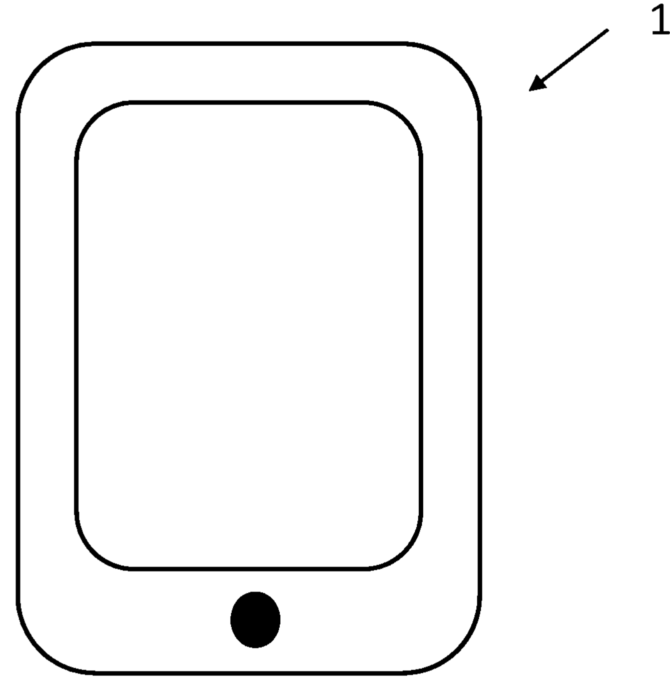
FIG. 1*a* illustrates a mobile device.

Before discussing the embodiments with reference to the accompanying figures, the following description of embodiments and associated advantages is provided.

In accordance with one embodiment there is provided a method of compressing a set of weight values in a neural network, the method comprising: obtaining an uncompressed set of numerical weight values, the uncompressed set of weight values including a plurality of weight values associated with a neural network; identifying a frequently occurring positive weight value within the set of weight values; replacing each occurrence of the frequently occurring weight value within the set of weight values with an index value, wherein the index value is a code selected to have shorter bit length than the frequently occurring weight value that it replaces; increasing each positive weight value within the set of weight values that has not been replaced by the index value to accommodate the index value; associating the frequently occurring weight value and the index value with the set of weight values to generate an updated set of weight values; and storing a compressed set of weight values generated based on the updated set of weight values in a computer-readable storage medium. By replacing the frequently occurring weight value with an index value that is less storage intensive, the storage size of the set of weight values may be compressed.

The steps of identifying a frequently occurring weight value, replacing each occurrence of the frequently occurring weight value, and associating the frequently occurring weight value and the index value may form a sequence of steps that are repeated to generate a plurality of different index values and associated frequently occurring weight values, wherein increasing the weight values includes increasing each of the weight values within the set of weight values that has not been replaced by an index value of the different index values by one at each round in order to accommodate the newly added index value. In this way, multiple weight values within the set of weight values may be replaced by less storage intensive index values and the set of weight values may be further compressed.

After each iteration of the sequence of steps, the method may comprise a step of measuring a reduction in size of the updated set of weight values. The method may comprise performing additional iterations of the sequence of steps until a measured reduction in size of the updated set of weight values is less than a predetermined threshold. In this way an optimal number of index values to be added to the set of weight values may be determined.

The indices used to represent the plurality of frequently occurring weight values may be the lowest values in a numerical sequence. This allows the lowest value numbers in the sequence to be assigned to index values, which for some compression methods causes the index values to be the least storage intensive values. Additionally, by increasing the weights values by an amount equal to the number of different index values added to the uncompressed set of weights, the index values may be accommodated within the numeral sequence without creating any ambiguity between the weight values and the index values.

In some other embodiments, the plurality of weight values are numerical values that can take positive or negative values. In such a case, the method may comprise: identifying a frequently occurring negative weight value within the set of weight values; replacing each occurrence of the frequently occurring negative weight value within the set of weight values with an index value, wherein the index value is a code selected to have shorter bit length than the frequently occurring weight value that it replaces; decreasing each negative weight value within the updated set of weight values that has not been replaced by the index value to accommodate the index value; and associating the frequently occurring negative weight value and the index value with the set of weight values to generate an updated set of weight values. In this way index values may be accommodated within the numeral sequence without creating any ambiguity between the weight values and the index values.

The weight values may be variable length codes. The variable length codes may be Golomb codes, such as Golomb Rice codes. In this way the index values can be less storage intensive than the weight values that they replace.

In accordance with a further embodiment there may be provided a method, performed by a weight decoder of a neural processing unit, of decompressing a compressed set of numerical weight values that includes a plurality of weight values associated with a neural network, the method comprising: obtaining a compressed set of weight values; identifying one or more index values and respective corresponding frequently occurring weight values associated with the compressed set of weight values; identifying a numerical value of a weight value in the compressed set of weight values and determining whether the numerical value of the weight value has a value that is less than or equal to the number of index values associated with the set of weight values; and for each weight value; if the weight value has a value that is less than or equal to the number of index values associated with the set of weight values, identifying the weight value as an index value and replacing the weight value with a weight value corresponding to the index value; if the weight value has a value that is greater than the number of index values associated with the set of weight values, subtracting a value equal to the number of index values associated with the set of weight values from the weight value.

Within the method of decompressing a compressed set of weight values the steps of identifying one or more index values and respective corresponding frequently occurring weight values, and replacing each instance of the index value in the set of weight values may form a sequence of steps, and the sequence of steps may be repeated for each of a plurality of index values and corresponding frequently occurring weight values associated with the compressed set of weight values.

The method of decompressing a set of compressed weight values may comprise sequentially decoding the compressed set of weight values by first loading the plurality of index values and frequently occurring weight values into a storage of the weight decoder and subsequently reading respective ones of the plurality of weight values from the set of compressed weight values, wherein each time an index value is read in the compressed set of weight values being processed, the weight decoder reads the frequently occurring weight value associated with the index value from the storage and replaces the index value with the associated frequently occurring weight value in the processed set of weight values.

A further embodiment may provide a weight decoder of a neural processing unit, adapted to decompress a compressed set of numerical weight values, which compressed set of weight values includes a plurality of weight values associated with a neural network, the processing element adapted to: obtain a compressed set of weight values; identify one or more index values and respective corresponding frequently occurring weight values associated with the compressed set of weight values; identify a numerical value of a weight value in the compressed set of weight values and determine whether the numerical value of the weight value has a value that is less than or equal to the number of index values associated with the compressed set of weight values; and for each weight value; if the weight value has a value that is less than or equal to the number of index values associated with the set of weight values, identify the weight value as an index value and replace the weight value with a weight value corresponding to the index value, if the weight value has a value that is greater than the number of index values associated with the set of weight values, subtract a value equal to the number of index values associated with the set of weight values from the weight value.

The weight values may be Golomb Rice codes.

A further embodiment provides a non-transitory computer-readable storage medium storing code portions that, when executed on a processing element, cause the processing element to perform a method of compressing a set of weight values, the method comprising: obtaining an uncompressed set of weight values, the uncompressed set of weight values including a plurality of weight values associated with a neural network; identifying a frequently occurring weight value among the plurality of weight values within the set of weight values; replacing each occurrence of the frequently occurring weight value within the set of weight values with an index value; and associating the frequently occurring weight value and the index value with the set of weight values, wherein the index value is less storage intensive than the frequently occurring weight value that it replaces.

A further embodiment provides a non-transitory computer-readable storage medium storing code portions that, when executed on a processing element, cause the processing element to perform a method of decompressing a compressed set of weight values that includes a plurality of weight values associated with a neural network, the method comprising: identifying an index value and a corresponding frequently occurring weight value associated with the compressed set of weight values; reading the compressed set of weight values, and identifying one or more instances of the index value in the set of weight values; replacing each instance of the index value in the set of weight values with the frequently occurring weight value.

A further embodiment provides a data processing apparatus comprising a processing element and a storage, the storage storing code portions that, when executed by the processing element, cause the data processing apparatus to perform a method of compressing a set of weight values, the method comprising: obtaining an uncompressed set of weight values, the uncompressed set of weight values including a plurality of weight values associated with a neural network; identifying a frequently occurring weight value among the plurality of weight values within the set of weight values; replacing each occurrence of the frequently occurring weight value within the set of weight values with an index value; and associating the frequently occurring weight value and the index value with the set of weight values, wherein the index value is less storage intensive than the frequently occurring weight value that it replaces.

A further embodiment provides a compressed set of weight values, which weight values are associated with a neural network, the compressed set of weight values comprising a plurality of weight values, a plurality of instances of an index value that has been substituted into the set of weight values in place of a frequently occurring weight value, and the index value associated with the frequently occurring weight value for which it has been substituted.

Particular embodiments will now be described with reference to the Figures.

Figure 1B:
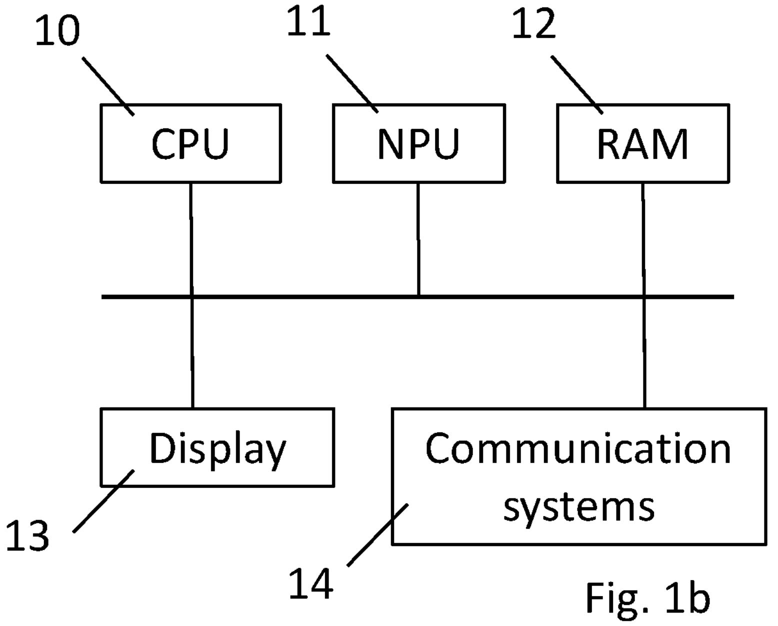
FIG. 1*b* is a diagram showing hardware of the mobile device.

FIG. 1*a* shows a mobile device 1 of a first particular embodiment. Although a mobile device 1 is described herein, the techniques described may be applied to any type of computing device that retrieves weight values associated with neural networks including, without limitation, tablet computers, laptop computers, personal computers (PC), servers, etc. FIG. 1*b* shows hardware of the mobile device 1. The mobile device 1 includes a processing element in the form of a CPU 10 and a specialized processor 11 in the form of a neural processing unit (NPU). The NPU 11 is a form of hardware accelerator for performing calculations relating to artificial intelligence, such as calculations relating to neural networks. The mobile device 1 additionally includes storage in the form of random-access memory (RAM) 12. Additional non-volatile storage is also provided, but not illustrated in FIG. 1*b*. The mobile device 1 includes a display 13 for displaying information to a user and communications systems 14 to allow the mobile device 1 to connect to transfer and receive data over various data networks using technologies such as Wi-Fi™ and LTE™.

Figure 2:
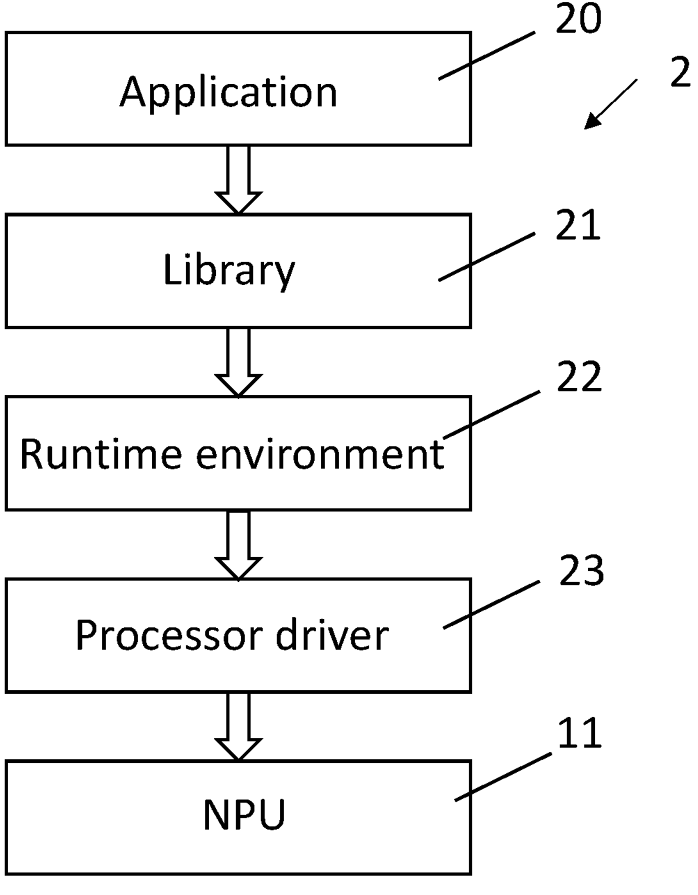
FIG. 2 is a diagram showing a system architecture installed on the mobile device.

FIG. 2 shows a system architecture 2 installed on the mobile device 1 associated with the NPU 11. The system architecture 2 allows a software application 20 to access the NPU 11 for hardware acceleration of calculations relating to neural networks. The system architecture 2 is an Android® software architecture, for use on a mobile telephone, tablet computer or the like.

The software application 20 has been developed to make use of a machine learning library 21 for hardware acceleration of certain processes in relation to neural network processing. A runtime environment 22 is provided below the library, known as Android® Neural Networks Runtime which receives instructions and data from the application 20. The runtime environment 22 is an intermediate layer that is responsible for communication between the software application 20 and the NPU 11 and scheduling of execution tasks on the most suitable hardware. Beneath the runtime environment 22 there is provided at least one processor driver and an associated specialized processor, in this case the NPU 11. There may be multiple processor processors and associated drivers provided beneath the runtime environment 22, such as a digital signal processor, a neural network processor and a graphics processor (GPU). However, in order to avoid redundant description, only the NPU 11 and associated processor driver 23 will be described in connection with the first particular embodiment.

Figure 3:
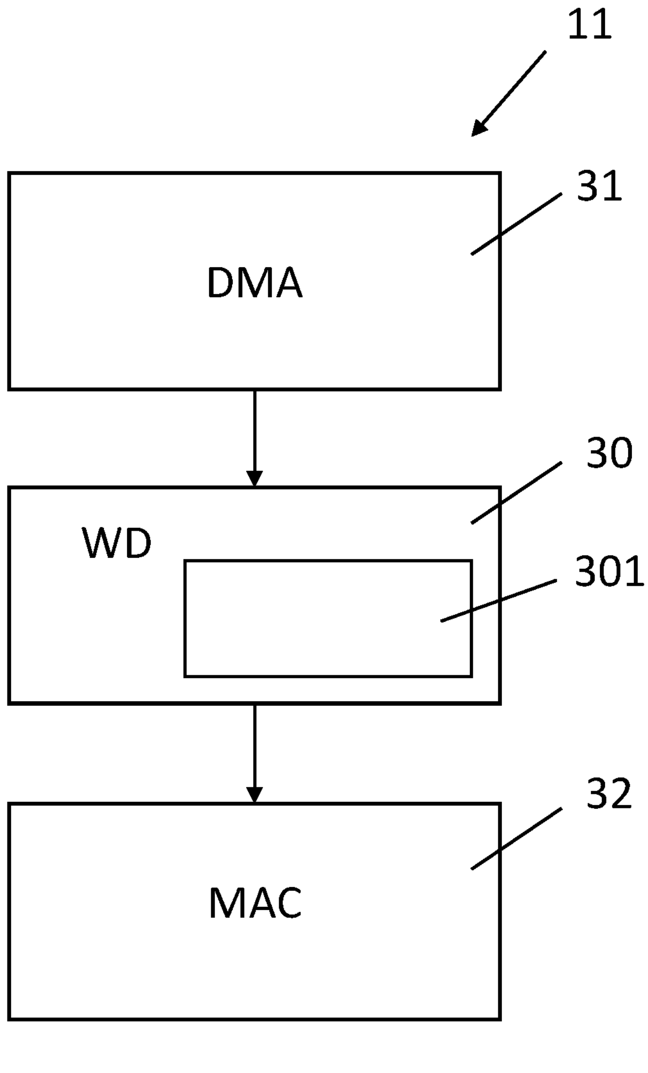
FIG. 3 is a diagram showing components of a neural processing unit.

FIG. 3 shows subcomponents of the NPU 11. The NPU 11 includes a weight decoder 30 connected to a direct memory access component 31 that handles data transfers on an external interface to the RAM 12 of the mobile device 1. The weight decoder 30 includes a register 301 in which data can be stored. The function of the register 301 will be explained in greater detail later. Decoded values from the weight decoder 30 are sent to a multiplier accumulator unit 32 for subsequent processing by the NPU 11.

The technique for data stream compression and decompression described herein relates to compression performed by the processor driver 23 which stores a compressed set of weight values in the RAM 12 and decompression performed at the weight decoder 30. Accessing data stored in the RAM 12 is a relatively slow process compared to the weight decoder clock cycle. Accordingly, increasing the speed of transfer of data across an external bus from the RAM 12 to the direct memory access component 31 is desirable in terms of optimizing performance of the NPU 11. One way of increasing the speed of transfer is by compressing the weight data as it is stored in the RAM 12. This reduces the size of the data to be retrieved from the RAM 12 and can increase throughput. However, in a case where the data being retrieved is weight values of a neural network some problems may arise. If a lossy compression technique is applied to the weight values when they are stored on the RAM 12, the modification of the weight values caused by compression errors may affect the accuracy of the neural network. Accordingly, use of lossy compression may require careful measurement against sample user data in order to determine whether lossy compression has had a significant effect on the accuracy of the neural network. The first particular embodiment applies a lossless weight compression technique in order to increase the transfer speed of stored weight values without altering the weight values being retrieved.

Figure 4:
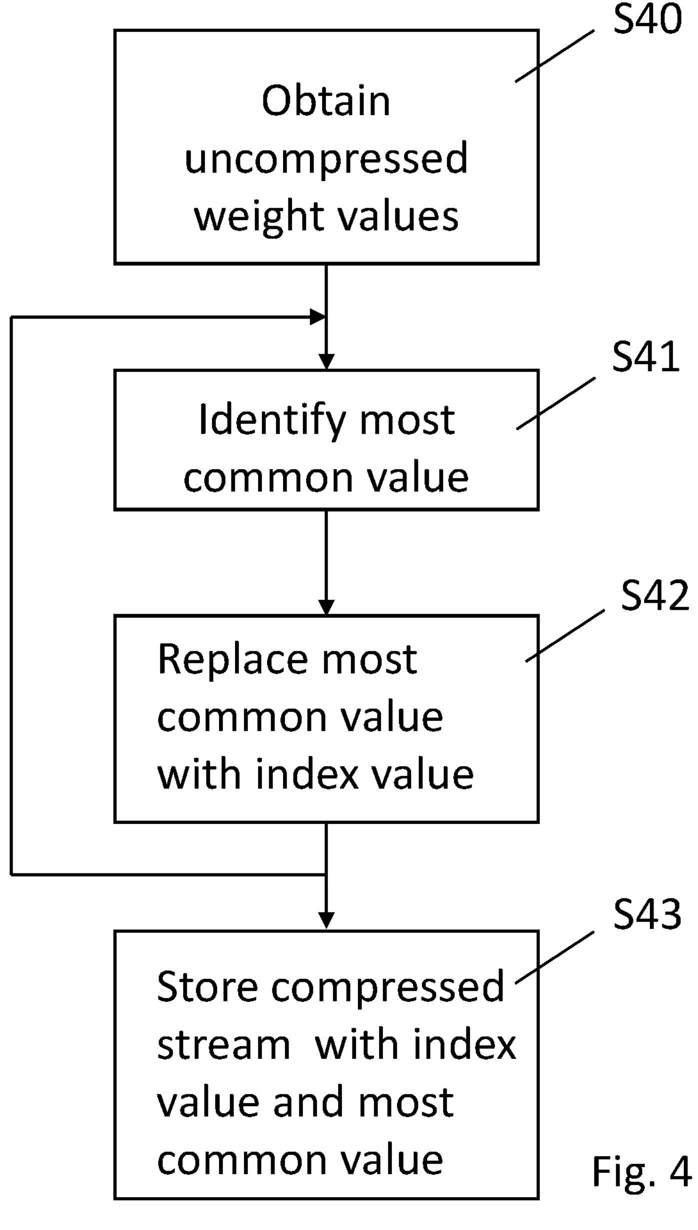
FIG. 4 is a flow chart showing steps for compressing a data stream.

FIG. 4 is a flow chart showing processes performed by the processor driver 23 when storing weight values in RAM 12. In step S40 the processor driver 23 obtains a set of uncompressed (raw) weight values for a neural network. The source of the uncompressed weight values does not matter for the purposes of the techniques discussed here. However, in one example, the uncompressed weight values may be provided to the Android Neural Networks Runtime by the application 20. Weight values may typically be of 8 or 16 bits in length, but could have any length. Additionally, in step S40, an original compressed set of weight values is created by compressing the uncompressed weight values using a compression method. In this case, the uncompressed weight values are converted to variable length codes. More particularly, the weight values are converted to Golomb Rice codes. The size of the compressed set of original weight values is determined and stored for reference.

In step S41, the set of uncompressed weight values is examined by the processor driver 23 to identify a frequently occurring weight value in the form of a most common weight value in the set of weight values. This is to say that the frequency of occurrence of each weight value in the set of weight values is examined and the most frequently occurring weight value is identified as the most common weight value.

In step S42 each instance of the most common weight value, which was identified in step S41, is replaced with an index value. The index value is selected to be the lowest available index value. FIG. 5*a* shows a list of index values and corresponding weight values in the order in which they were selected. The index values and weight values are in binary form. The index value in S42 is selected to be the lowest value in a numerical sequence that has not yet been taken by an index value from a previous iteration of steps S41 and S42. In the first embodiment, the weight values take values in a numerical sequence that is natural numbers (including 0).

When a new index number is added in step S42 a further step is required. The new index value may have the same value as an existing weight value in the set of weight values. In order to avoid creating a difficult in resolving within the weight value set between the index values and weight values, each weight value has its value increased by one when a new index value is added in order to make room for the index value in the sequence. FIG. 5*b* is a table showing index values of FIG. 5*a* along with the adjustment to be made to the weight value to accommodate the newly introduced index values in a case where a maximum number of 32 index values are used. In particular, it can be seen from FIG. 5*b* that values from 0 to 31 are taken by index values and that the weight values are adjusted by 32 in order to accommodate the index values in the sequence of numbers. As there are 32 index values shown in FIG. 5*a*, the weight values in FIG. 5*b* are each increased by 32.

After the set of weight values has had a new index value added to it and the weight values have been incremented in step S42 a modified set of weight values is formed. The modified set of weight values includes a) the set of weight values in which a most common weight value has been added in step S42, and b) the newly added index value and any other index values from previous iterations stored in association with the most common weight values that they replaced within the modified set of weight values.

Figure 6:
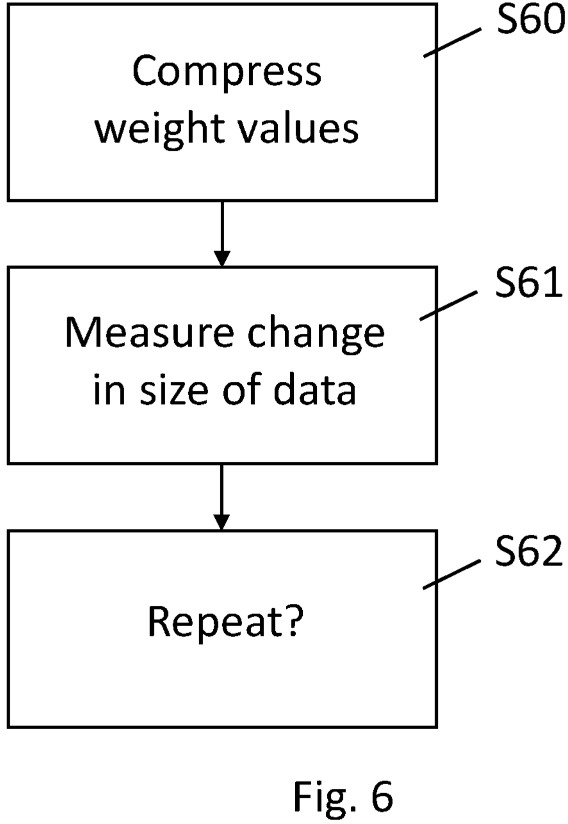
FIG. 6 is a flowchart showing steps for deciding whether to repeat a process of adding an index value to a set of weights.

Once the new index value has been added and the weight values have been adjusted, step S42 also includes a decision process to decide whether to replace another most common weight value with an index in the modified set of weight values. This decision process is illustrated in FIG. 6. In step S60 each weight value within the modified set of weight values is compressed by conversion to Golomb Rice codes. This conversion to Golomb Rice codes includes converting each index value and each associated most common value associated with and included in the modified set of weight values to Golomb Rice codes. In a first iteration, when step S42 is performed for the first time, the size of the compressed modified set of weight values is compared with the size of the compressed set of original weight values. If the size of the compressed modified set of weight values is smaller than the size of the compressed set of original weight values by more than a predetermined threshold it is determined that the process should be repeated. In subsequent iterations of steps S41 and S42, the size of the compressed modified set of weight values is compared with the size of the compressed modified set of weight values from the preceding iteration.

In the first iteration of the process illustrated in FIG. 4, only one index value has been replaced by the index value 0 (illustrated in binary form in FIG. 5*a*). This index value will compress to a short Golomb Rice code, which is likely to be less storage intensive than the weight value that it replaced in the modified set of weight values. By virtue of this process the size of the modified set of weight values may be smaller than the compressed set of original weight values. However, in creating the modified set of weight values it was necessary to add Golomb Rice codes corresponding to the index value and the most common weight value to the modified set of weight values in order to allow the original uncompressed weight values to be recreated. Accordingly, below a certain level of frequency of occurrence of a most common weight value, replacing the most common weight value with an index value will no longer result in a reduced size of the compressed modified set of weight values.

In step S62 a decision is made as to whether to repeat steps S41 and S42. In a case where the size of the compressed modified set of weight values is not smaller than the compressed modified set of weight values in the previous iteration of steps S41 and S42 by more than a predetermined amount, the decision in step S62 is to proceed to step S43. In a case where the size of the compressed modified set of weight values is smaller than the compressed modified set of weight values in the previous iteration of steps S41 and S42, it is desirable to repeat steps S41 and S42. However, the register 301 in the weight decoder 30 only has a limited capacity to store index values and most common weight values for decoding. Accordingly, there is a maximum number of most common weight values that should be replaced in the modified set of weight values. In the first particular embodiment, the maximum number of index values and associated most common weight values is 32. If the maximum number of index values has been added to the modified set of weight values then the decision at S62 will be not to repeat steps S41 and S42 regardless of the effect of adding the most recent index value. If the size of the compressed modified set of weight values is smaller than the size of the compressed modified set of weight values from the preceding iteration (or smaller than the compressed set of original weight values in the first iteration) by more than the predetermined amount and the number of different index values in the modified set of weight values is less than 32, the decision in S62 is to repeat steps S41 and S42.

In step S43 the processor driver 23 stores the compressed modified set of weight values in the RAM 12 as a compressed set of weight values. As described above, the compressed modified set of weight values are represented by Golomb Rice codes.

The modified set of weight values stored in the RAM 12 may be retrieved by the direct memory access component 31 to allow the weight values to be decoded by the weight decoder 30 for use in the NPU 11.

Figure 7:
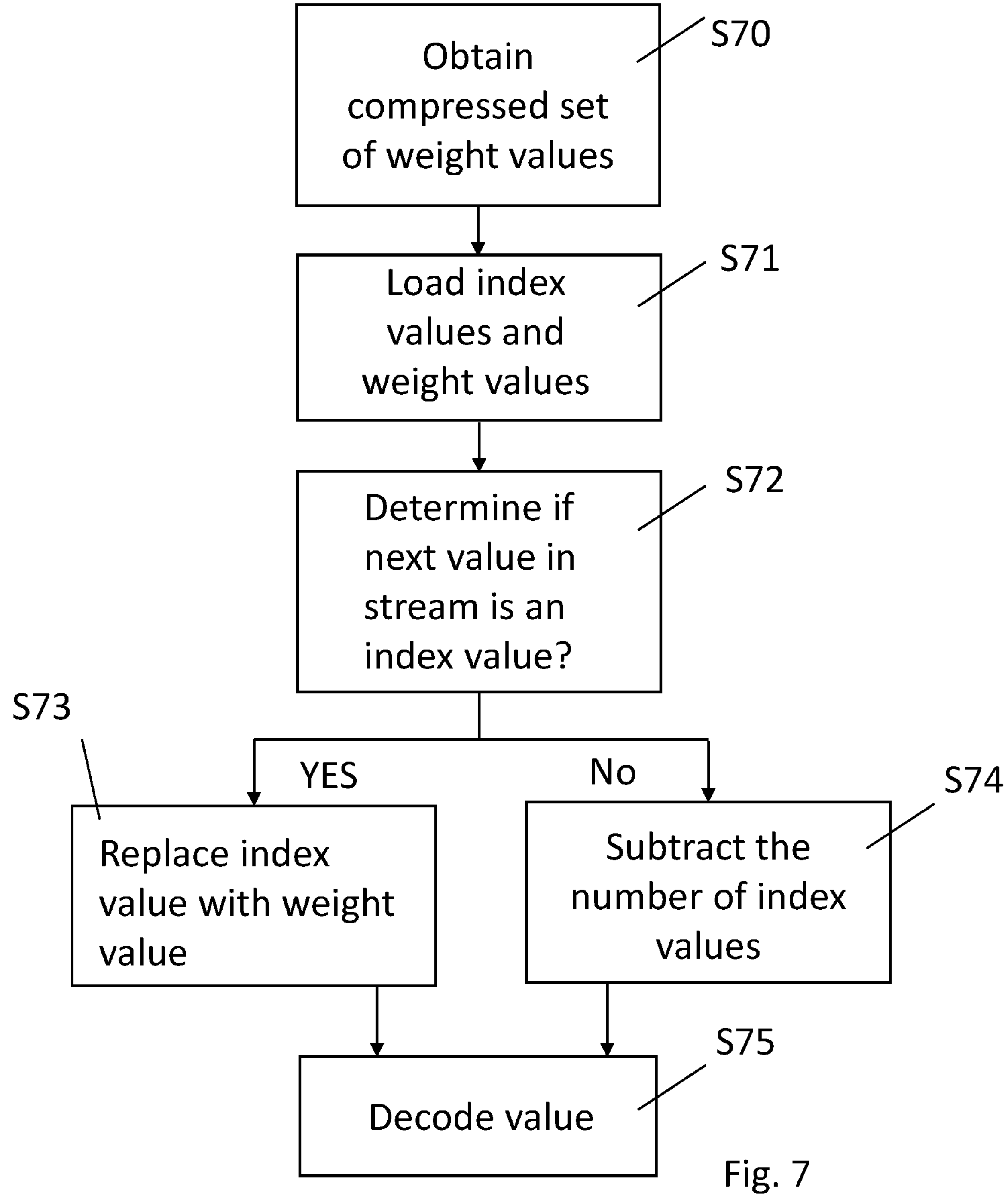
FIG. 7 is a flowchart showing steps for decoding a compressed set of weight values.

FIG. 7 shows a method performed by the weight decoder 30 to decompress a weight stream. In step S70 the compressed set of weight values is retrieved from the RAM 12 as a stream by the direct memory access component 31 and passed to the weight decoder 30. In step S71 the index values and associated most common weight values are identified from the received weight stream. In this example, the index values and weight values are included in a first portion of the weight stream retrieved by the direct memory access component 31.

In step S71, the weight decoder 30 stores the index values and associated most common weight values in the register 301. In step S72, after loading all the index values and most common weight values into the register 301, the weight decoder 30 evaluates, in turn, each received value in the compressed set of weight values received from the direct memory access component 31. The weight decoder 30 evaluates the received value to determine whether the value is higher or lower in value than the number of index values received in the compressed weight stream. This evaluation may be performed by decoding the Golomb Rice code to determine if its value is greater than the number of index values or not. Alternatively, this evaluation can be performed using a look-up table to determine the value of the Golomb Rice code. In other words, it is not necessary to decode the Golomb Rice code, but instead its value could be looked up.

If the received value is evaluated to be less than or equal to the number of index values received with the compressed set of weight values then the received value is determined to be an index value. This can be understood because the index values were selected to be the lowest values in step S42 of the encoding process. In this case, the method proceeds to step S73 in which the received index value is looked up in the register 301 and the index value is replaced by the associated most common value represented by the index value.

If the received value is evaluated to be greater than the number of index values received with the compressed weight values then it is determined that the received value is a weight value. In this case, the method proceeds to step S74 in which the weight value is adjusted by subtracting a value equal to the number of index values received in the first portion of the weight stream from the direct memory access component 31. This step has the effect of reversing the adjustment to the weight values made in S42.

Following step S73 or S74 the decoder decodes each weight value in step S75 and passes the weight value to the multiplier accumulator unit 32. Further description of operation of the NPU 11 is not provided here as it is not relevant to the technique described herein. Suitable examples of processing by an NPU are known and available in the prior art.

A second particular embodiment will now be described. In the first embodiment the weight values of the neural network were natural numbers, including 0. In the second embodiment, the weight values are signed and can take either positive or negative values. Referring again to FIG. 4, a set of uncompressed weight values is obtained. The weight values are in binary form and can take positive or negative values. The sign of the weight value is indicated by the first bit of the binary sequence and is referred to as a sign bit. If the value of the sign bit is 0 the binary value is positive and if the value of the sign bit is 1 the binary value is negative.

In step S41 the most common weight value is identified as described in connection with the first particular embodiment. In step S42 the most common weight value is replaced by an index value. In the second particular embodiment, in the first iteration of steps S41 and S42, the most common value is replaced by index value 0. In the second iteration of steps S41 and S42, in which a second most common value is identified, the index value selected in S42 is −1 (100000001). In the following iteration, the index value selected is 1, followed by −2, 2, −3, 3 etc. In other words, the index values are selected to represent most common values identified in different iterations of steps S41 and S42 are selected to have the lowest absolute value so that they are represented by the smallest possible Golomb Rice codes when compressed.

FIG. 8*a* shows a table of index values and associated most common weight values for a case in which 32 index values are provided and the weight values are signed. In this case, the index values range between −16 and 15 in value (represented in binary form).

In the first embodiment, in step S42 the value of each weight value was incremented by one each time an index value was added to the set of weights. In the second embodiment, in the first iteration, when index value 0 is introduced, the positive weight values and the value 0 in the set of modified weight values are incremented by one. In the second iteration, when the value −1 is introduced as an index value, the negative weight values are decremented by one to accommodate the index value −1. This process alternates as steps S41 and S42 iterate. In other words, the weight values are adjusted to increase a value of each of the positive weight values and 0 within the data stream that has not been replaced by an index value and reduce each of the negative weight values that has not been replaced by an index value within the data stream by an amount sufficient to allow the index values to be unambiguously added to the set of weight values. FIG. 8*b* shows a sequence of values and how the index values are accommodated by adjusting the weight values. Similar to FIG. 5*b*, the situation illustrated by FIG. 8*b* is a case in which a maximum number of 32 index values have been used to replace most common values within the set of weight values. It can be seen that the index values run from −16 to 15. For the weight value [0] and positive weight values an offset of +16 is applied to accommodate the index values. For negative weight values an offset of −16 is applied.

At the weight decoder 30, the process described in the first embodiment with reference to FIG. 7 is followed with the following differences. When determining whether a value received from the direct memory access component 31 is an index value, the sign of the received value is determined and then it is determined whether or not the absolute value of the received value is greater than the relevant offset to weight values of that sign. As the offset to the weight values required to accommodate the index values may be different for positive and negative weight values it is necessary for the weight decoder 30 to identify the relevant offset based on the sign of the received value. If the received value is determined to be an index value because its value is less than or equal to the offset value, the corresponding weight value is looked up and substituted in step S73 as described in the first embodiment. If the received value is determined to be a weight value, the weight value is adjusted by the relevant offset value in step S74.

The technique described above has been illustrated in first and second embodiments. However, additional embodiments are envisaged. In the first and second embodiments the method is applied to a set of weight values associated with a neural network. However, in other embodiments, the method could be applied to a sets of weight values. For example, the same index values and most common weight values could be used across weight value sets relating to different layers of a neural network or relating to different neural networks if the neural networks have similar weight value structures. This implementation might be helpful where the sets of weight values are very similar and the most common weight values are similar between the neural networks or layers within a neural network. This implementation allows a reduction in the bit cost of associating the index values and associated most common values with the data received from the direct memory access component 31. In a further embodiment, the method may be applied to part but not all of a set of weight values associated with a neural network. This implementation allows an improved compression in a case where different weight values are most common in association with different nodes in the neural network and there is advantage in selecting different most common weights for different subsets of the weight values for the neural network or layer of the neural network.

The first and second embodiments describe sets of weight values in binary form that are converted into Golomb Rice codes. The binary values are illustrated in FIGS. 5*a* and 8*a*. In other embodiments, the values may be in different form. For example, it is possible to use this technique directly on weight values that are already in the form of Golomb Rice codes. In such an implementation, the most frequently occurring weight value can be selected and replaced by an index value and there is no need to convert from binary to Golomb Rice codes to determine the size of the modified set of weight values.

The first and second embodiments have used Golomb Rice as a compression method. However, the technique is not limited to this. For example, in other embodiments run length encoding may be used in place of Golomb Rice codes because for fixed length binary strings, run length encoding allows lower values to be more efficiently compressed than other values.

The first and second embodiments described the invention applied to an Android® neural network architecture. However, the techniques described herein may be applied to different software architectures depending on the situation. For example, different software architecture would be used in the context of a server-based implementation.

What is claimed is:

1. A method, performed by a computing device comprising a processing element, of compressing weight data representing a set of weight values in a neural network, the method, performed by the processing element, comprising:

obtaining the weight data representing the set of weight values, the set of weight values including a plurality of weight values associated with the neural network;

processing the weight data to identify a frequently occurring positive weight value within the set of weight values;

modifying the weight data by replacing each occurrence of the frequently occurring positive weight value within the set of weight values with a replacement value representing the frequently occurring positive weight value, wherein a magnitude of the replacement value is smaller than a magnitude of the frequently occurring positive weight value;

further modifying the weight data by incrementing each positive weight value within the set of weight values that has not been replaced by the replacement value, wherein incrementing each positive weight value within the set of weight values that has not been replaced by the replacement value accommodates the replacement value by ensuring that positive weight values that have not been replaced by the replacement value in the set of weight values have a larger magnitude than the replacement value;

generating modified weight data representing at least:

the set of weight values after the further modifying the weight data; and the replacement value associated with the frequently occurring positive weight value;

performing a lossless data compression on the modified weight data to form compressed weight data by converting the set of weight values to variable length codes, wherein the compressed weight data represents the replacement value using a variable length code that has a shorter bit length than a variable length code corresponding to the frequently occurring positive weight value that the replacement value replaced; and transferring the compressed weight data from the processing element to a computer-readable storage medium for storage.

2. The method according to claim 1, wherein steps of processing the weight data to identify a frequently occurring weight value within the set of weight values, modifying the weight data by replacing each occurrence of the frequently occurring weight value within the set of weight values with a replacement value with a magnitude smaller than a magnitude of the frequently occurring weight value, further modifying the weight data by incrementing a magnitude of each weight value within the set of weight values that has not been replaced by the replacement value and associating the frequently occurring weight value and the replacement value form a sequence of steps that are repeated to generate a plurality of different replacement values and associated frequently occurring weight values further represented by the modified weight data.

3. The method according to claim 2, wherein after each iteration of the sequence of steps, the method comprises a step of measuring a reduction in size of the modified weight data, the method comprising performing additional iterations of the sequence of steps until a measured reduction in size of the modified weight data is less than a predetermined threshold.

4. The method according to claim 2, wherein, for an initial iteration of the sequence of steps, the replacement value is zero.

5. The method according to claim 1, wherein the set of weight values are numerical values that can take positive or negative values and the method comprises:

processing the weight data to identify a frequently occurring negative weight value within the set of weight values;

modifying the weight data by replacing each occurrence of the frequently occurring negative weight value within the set of weight values with a further replacement value, wherein a magnitude of the further replacement value is smaller than a magnitude of the frequently occurring negative weight value; and further modifying the weight data by decrementing each negative weight value within the updated set of weight values that has not been replaced by the replacement value to accommodate the replacement value such that negative weight values that have not been replaced by the further replacement value in the set of weight values have a larger magnitude than the further replacement value, the modified weight data further representing the further replacement value in association with the frequently occurring negative weight value.

6. The method according to claim 2, wherein the set of weight values form a numerical sequence and the plurality of different replacement values are the lowest absolute values in the numerical sequence.

7. The method according to claim 1, wherein the variable length code representing the replacement value is selected to be the shortest available variable length code.

8. A method, performed by a weight decoder of a processing element, of decompressing compressed weight data representing a compressed version of modified weight data representing at least: a set of weight values associated with a neural network; and one or more replacement values associated with respective one or more frequently occurring weight values, the method comprising:

receiving the compressed weight data at the weight decoder from a computer-readable storage medium, wherein the compressed weight data has been formed by a lossless data compression of the modified weight data by converting the set of weight values to variable length codes;

identifying, based on the compressed weight data, the one or more replacement values and the respective one or more frequently occurring weight values associated with the one or more replacement values;

identifying, based on the compressed weight data, a weight value from the set of weight values and determining whether the weight value is less than or equal to a count of the one or more replacement values; and at least partly decompressing the compressed weight data to obtain decompressed weight data representing a decompressed version of the set of weight values, comprising, for each weight value:

if the weight value is less than or equal to the count of the one or more replacement values, identifying the weight value as a replacement value and replacing the weight value with a frequently occurring weight value corresponding to the replacement value, wherein the compressed weight data represents the replacement value using a variable length code that has a shorter bit length than a variable length code corresponding to the weight value to replace the replacement value, if the weight value is greater than the count of the one or more replacement values, subtracting a value equal to the count of replacement values associated with the set of weight values from the weight value.

9. The method of decompressing the compressed weight data according to claim 8, wherein the steps of identifying, based on the compressed weight data, the one or more replacement values and the respective one or more frequently occurring weight values, and replacing each instance of the one or more replacement values in the set of weight values with the respective frequently occurring weight value form a sequence of steps, and the sequence of steps is repeated for each of a plurality of replacement values and corresponding frequently occurring weight values.

10. The method of decompressing the compressed weight data according to claim 9, further comprising sequentially decoding the compressed weight data by first loading the one or more replacement values and frequently occurring weight values into a storage of the weight decoder and subsequently reading respective ones of the plurality of weight values from the set of weight values, wherein each time an replacement value is read in the set of weight values being processed, the weight decoder reads the frequently occurring weight value associated with the replacement value from the storage and replaces the replacement value with the associated frequently occurring weight value in the set of weight values.

11. A processing element comprising a weight decoder adapted to decompress compressed weight data representing a compressed version of modified weight data representing at least: a set of weight values associated with a neural network; and one or more replacement values associated with respective one or more frequently occurring weight values, the processing element adapted to:

receive the compressed weight data at the weight decoder from a computer-readable storage medium, wherein the compressed weight data has been formed by a lossless data compression of the modified weight data by converting the set of weight values to variable length codes;

identify, based on the compressed weight data, the one or more replacement values and the respective one or more frequently occurring weight values associated with the one or more replacement values;

identify, based on the compressed weight data, a weight value of the set of weight values in the compressed set of weight values and determine whether the weight value is less than or equal to a count of the one or more replacement values; and at least partly decompress the compressed weight data to obtain decompressed weight data representing a decompressed version of the set of weight values, comprising, for each weight value:

if the weight value is less than or equal to the count of the one or more replacement values, identify the weight value as an replacement value and replace the weight value with a frequently occurring weight value corresponding to the replacement value, wherein the compressed weight data represents the replacement value using a variable length code that has a shorter bit length than a variable length code corresponding to the weight value to replace the replacement value, if the weight value is greater than the count of the one or more replacement values, subtract a value equal to the count of replacement values associated with the set of weight values from the weight value.

12. The method according to claim 6, wherein the variable length codes representing the set of weight values are Golomb Rice codes.

13. The method according to claim 1, wherein the frequently occurring positive weight value within the set of weight values is the most common weight value within the set of weight values.

* * * * *